US012247717B1

(12) United States Patent
Hetrick

(10) Patent No.: US 12,247,717 B1
(45) Date of Patent: Mar. 11, 2025

(54) CLIP DEVICE FOR MOUNTING A LIGHT FIXTURE TO A CEILING TILE GRID

(71) Applicant: SIGNIFY HOLDING B.V., Eindhoven (NL)

(72) Inventor: Westly Davis Hetrick, Atlanta, GA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/470,634

(22) Filed: Sep. 20, 2023

(51) Int. Cl.
*F21S 8/02* (2006.01)
*F21V 21/088* (2006.01)

(52) U.S. Cl.
CPC ............ *F21S 8/026* (2013.01); *F21V 21/088* (2013.01)

(58) Field of Classification Search
CPC ........... F21S 8/026; F21S 8/06; F21V 21/088; F21V 21/08; F21V 21/0832; F21V 17/00; F21V 19/00
See application file for complete search history.

(56) References Cited

U.S. PATENT DOCUMENTS

2008/0112172 A1 5/2008 Pahl

FOREIGN PATENT DOCUMENTS

| | | | | |
|---|---|---|---|---|
| CN | 206647889 U | | 11/2017 | |
| CN | 109690175 A | * | 4/2019 | ............ E04B 9/006 |
| CN | 110906215 A | | 3/2020 | |
| KR | 2387085 B1 | | 4/2022 | |

* cited by examiner

*Primary Examiner* — Anne M Hines
*Assistant Examiner* — Jose M Diaz

(57) ABSTRACT

A clip device for mounting a light fixture to a ceiling tile grid includes a base configured to be located on a surface of the light fixture. An edge portion extends from the base and is configured to be located in a recess in the surface of the light fixture. An arm extends from the edge portion through a first hinge such that the arm is bendable between a substantially horizontal orientation with respect to the surface of the light fixture to a substantially vertical orientation with respect to the surface of the light fixture when installed. A channel element extends from the arm through a second hinge such that the channel element is bendable to form a channel for receiving a portion of the ceiling tile grid to mount the light fixture. A light fixture system incorporating the clip device is also disclosed.

15 Claims, 13 Drawing Sheets

CLIP DEVICE FOR MOUNTING A LIGHT FIXTURE TO A CEILING TILE GRID

FIELD OF THE DISCLOSURE

The present disclosure is generally directed to a clip device for mounting a light fixture to a ceiling tile grid, and more specifically, to a clip device, and a light fixture system including the clip device, for edge-mounting the light fixture to the ceiling tile grid or for suspension mounting the light fixture.

BACKGROUND

Light fixtures have been developed that are configured to be installed in a ceiling tile grid with the ceiling tile visible. Such light fixtures require the use of a grid clip to connect the light fixture to the ceiling tile grid. This often requires the installer to install the grip clips, which increases installation time. Further, the installer may have to cut the ceiling tile to make room for the grid clips, which also increases installation time and can create aesthetic issues.

In some instances, the light fixtures may be either mounted to the ceiling tile grid or be suspension mounted from a ceiling. However, the grid clips used to mount to the ceiling may be visible when the user opts for a suspension mount, which can negatively impact the aesthetic appearance of the light fixture. Additionally, the inclusion of grid clips with the light fixture can increase the size of the fixture and also increase the associated shipping costs.

Accordingly, there is a need in the art for a clip device and lighting fixture system including the clip device that allow for quicker installation of the light fixture, provide for flexible mounting of the light fixture either to a ceiling tile grid or through a suspension mount, with good aesthetics, and are conveniently and economically shipped.

SUMMARY OF THE DISCLOSURE

The present disclosure is directed to a clip device for mounting a light fixture to a ceiling tile grid. The clip device also be utilized to suspension mount the light fixture. The clip device includes a base configured to be located on a surface of the light fixture. The base includes a pair of apertures each configured to receive an attachment mechanism, such as a screw or rivet for example, to couple the base to the surface of the lighting fixture. An edge portion extends from an edge of the base. The edge portion is configured to be located in a recess in the surface of the light fixture located proximate to an outer perimeter of the light fixture. In this manner, the clip device can be edge mounted to the light fixture within the outer perimeter. An arm extends from the edge portion through a first hinge such that the arm is bendable between a substantially horizontal orientation with respect to the surface of the light fixture to a substantially vertical orientation with respect to the surface of the light fixture when installed. The arm can advantageously be located in the horizontal position during shipping to reduce the size of the shipping container for the light fixture system. A channel element extends from the arm through a second hinge such that the channel element is bendable to form a channel for receiving a portion of the ceiling tile grid to mount the light fixture to the ceiling tile grid. This allows for quick an easy installation of the clip device in the field.

The clip device advantageously can be mounted on the edge of the light fixture to allow for space to potentially not have to cut a ceiling tile to fit within the frame of the light fixture. Further the location of the clip devices allows the clip device to be hidden by the frame of the light fixture even when the light fixture is installed in a suspended configuration. Accordingly, the clip device can remain attached to the light fixture in either mounting configuration.

Generally, in one aspect, a clip device for mounting a light fixture to a ceiling tile grid is provided. The clip device includes a base configured to be located on a surface of the light fixture.

An edge portion extends from an edge of the base. The edge portion is configured to be located in a recess in the surface of the light fixture located proximate to an edge of the light fixture.

An arm extends from the edge portion through a first hinge such that the arm is bendable between a substantially horizontal orientation with respect to the surface of the light fixture to a substantially vertical orientation with respect to the surface of the light fixture when installed.

A channel element extends from the arm through a second hinge such that the channel element is bendable to form a channel for receiving a portion of the ceiling tile grid to mount the light fixture to the ceiling tile grid.

According to an example, the clip device is formed from sheet metal.

According to an example, the first hinge and the second hinge are formed from areas of reduced thickness in the sheet metal.

According to an example, the base comprises a pair of apertures each configured to receive an attachment mechanism to couple the base to the surface of the lighting fixture.

According to an example, the channel element is L-shaped for receiving the portion of the ceiling tile grid.

According to an example, the clip device further includes an attachment element extending from the channel element through a third hinge. The attachment element is configured to be positioned along a surface of the portion of the ceiling tile grid when installed.

According to an example, the attachment element comprises an aperture for receiving an attachment mechanism to secure the attachment element to the portion of the ceiling grid.

According to an example, the clip device further includes a pair of flanges extending from opposing ends of the base through a fourth hinge and a fifth hinge, respectively, such that the pair of flanges are each bendable between a substantially horizontal orientation with respect to the surface of the light fixture to a substantially vertical orientation with respect to the surface of the light fixture when installed. The pair of flanges are configured to receive a suspension mounting device for suspension mounting of the light fixture.

Generally, in another aspect, a light fixture system is provided. The light fixture system includes a light fixture configured to be mounted to a ceiling tile grid. The light fixture has a recess in a surface thereof. The recess is located around an outer perimeter of the surface.

The light fixture system further includes a set of clip devices.

Each of the clip devices includes a base configured to be located the surface of the light fixture. An edge portion extends from an edge of the base. The edge portion is configured to be located in the recess in the surface of the light fixture. An arm extends from the edge portion through a first hinge such that the arm is bendable between a substantially horizontal orientation with respect to the surface of the light fixture to a substantially vertical orientation with respect to the surface of the light fixture when installed.

A channel element extends from the arm through a second hinge such that the channel element is bendable to form a channel for receiving a portion of the ceiling tile grid to mount the light fixture to the ceiling tile grid.

According to an example, the set of clip devices are positioned such that they are not visible from below when the light fixture system is suspension mounted.

According to an example, the base of each of the set of clip devices comprises a pair of apertures each configured to receive a attachment mechanism to couple the base to the surface of the lighting fixture.

According to an example, each of the set of clip devices are configured to be positioned flat against the surface of the light fixture prior to installation.

According to an example, the channel element is L-shaped for receiving the portion of the ceiling tile grid.

According to an example, each of the set of clip devices further comprises an attachment element extending from the channel element through a third hinge, the attachment element configured to be positioned along a surface of the portion of the ceiling tile grid when installed, the attachment element comprising an aperture for receiving a attachment mechanism to secure the attachment element to the portion of the ceiling grid.

According to an example, each of the set of clip devices comprises a pair of flanges extending from opposing ends of the base through a fourth hinge and a fifth hinge, respectively, such that the pair of flanges are each bendable between a substantially horizontal orientation with respect to the surface of the light fixture to a substantially vertical orientation with respect to the surface of the light fixture when installed. The pair of flanges are configured to receive a suspension mounting device for suspension mounting of the light fixture.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

These and other aspects of the various embodiments will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various embodiments.

DETAILED DESCRIPTION OF EMBODIMENTS

The present disclosure is directed to a clip device for mounting a light fixture to a ceiling tile grid. The clip device also be utilized to suspension mount the light fixture. The clip device includes a base configured to be located on a surface of the light fixture. The base includes a pair of apertures each configured to receive an attachment mechanism, such as a screw or rivet, to couple the base to the surface of the lighting fixture. An edge portion extends from an edge of the base. The edge portion is configured to be located in a recess in the surface of the light fixture located proximate to an outer perimeter of the light fixture. In this manner, the clip device can be edge mounted to the light fixture within the outer perimeter. An arm extends from the edge portion through a first hinge such that the arm is bendable between a substantially horizontal orientation with respect to the surface of the light fixture to a substantially vertical orientation with respect to the surface of the light fixture when installed. The arm can advantageously be located in the horizontal position during shipping to reduce the size of the shipping container for the light fixture system. A channel element extends from the arm through a second hinge such that the channel element is bendable to form a channel for receiving a portion of the ceiling tile grid to mount the light fixture to the ceiling tile grid. This allows for quick an easy installation of the clip device in the field.

Figure 1:
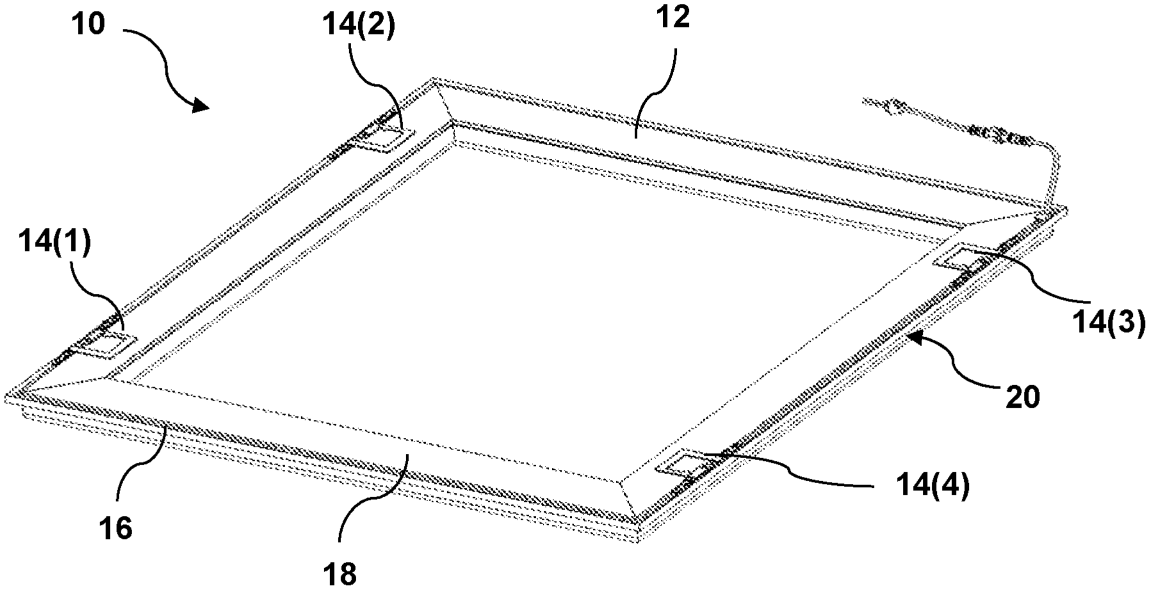
FIG. 1 is an isometric view of a light fixture system including a light fixture and a plurality of clip devices for mounting the light fixture, as viewed from above the ceiling, according to aspects of the present disclosure.
Figure 2:
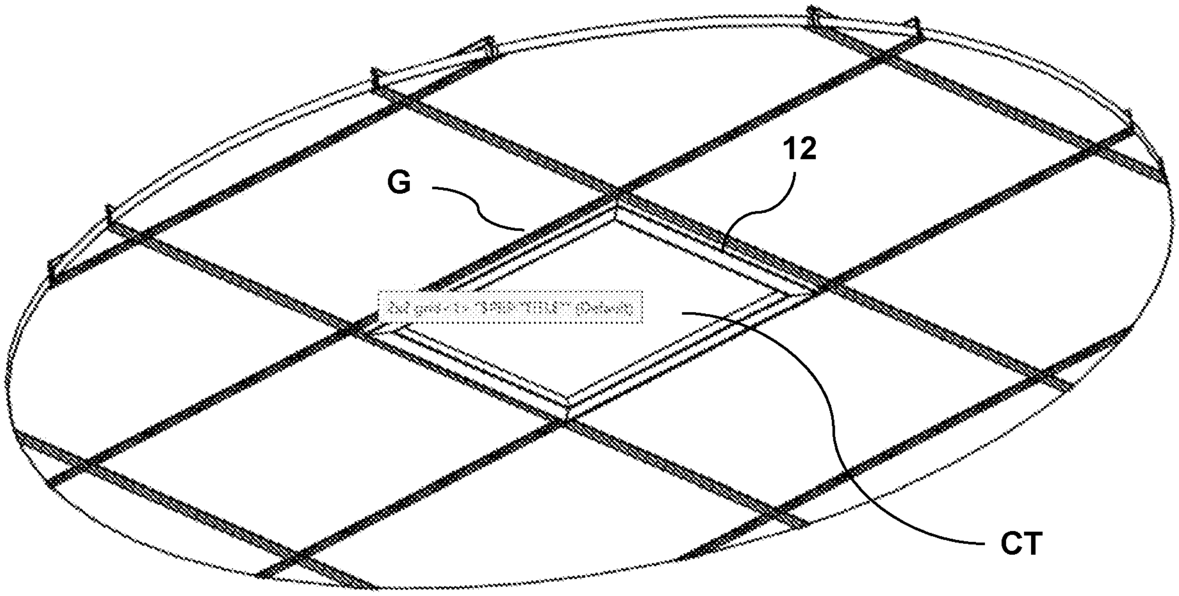
FIG. 2 is an isometric view of the exemplary light fixture shown in FIG. 1 mounted in a ceiling tile grid, according to aspects of the present disclosure.

FIG. 1 is an isometric view of an exemplary light fixture system 10 including a light fixture 12 and a set of clip device 14(1)-14(4). The light fixture 10 is configured to be mounted to a ceiling tile grid (G) using the clip devices 14(1)-14(4) with the ceiling tile (CT) visible from below as shown, for example, in FIG. 2. The light fixture 12 includes one or more light sources, such as light emitting diodes, to provide illumination. The clip devices 14(1)-14(4) advantageously generally allow for the light fixture 12 to be easily installed within the ceiling tile grid (G) without having to cut the ceiling tile (CT). Although the light fixture is shown in FIG. 2 is shown mounted to the ceiling tile grid (G), in other examples, as described in further detail below, the clip devices 14(1)-14(4) allow the light fixture 12 to be suspension mounted. The clip devices 14(1)-14(4) are designed so that they are not visible from below when the light fixture 12 is suspension mounted.

Referring now more specifically to FIGS. 1 and 3A-3C, the light fixture 12 has a recess 16 in a surface 18 thereof for receiving a portion of each of the clip devices 14(1)-14(4) as described in further detail below. The recess 16 extends around an outer perimeter 20 of the surface 18 of the light fixture 12, which allows for edge mounting the clip devices 14(1)-14(4) to the light fixture 12. The surface 18 is located opposite to the visible portion of the light fixture 12 when the light fixture 12 is installed. Edge mounting the clip devices 14(1)-14(4) in the recess 16 advantageously allows the clip devices 14(1)-14(4) to not be visible when the light fixture 12 is suspension mounted as described in further detail below. Additionally, edge mounting the clip devices 14(1)-14(4) allows the light fixture 12 to be installed in the ceiling tile grid (G) (as shown in FIG. 2) without cutting the ceiling tile (CT) which allows for more efficient installation.

Referring again to FIG. 1, although four clip devices 14(1)-14(*n*) are shown, it is to be understood that other numbers of clip devices could be employed in other configurations. FIGS. 1 and 3 illustrate the clip devices 14(1)-14(4) positioned for shipping of the light fixture system 10. In this configuration, the clip devices 14(1)-14(4) are configured to be positioned flat against the surface 18 of the light fixture 12 prior to installation. This allows the light fixture system 10 to be shipped without increasing the profile of the light fixture 12, which reduces the overall shipping costs of the light fixture system 10.

As described in further detail below, the clip devices 14(1)-14(4) have a number of hinges that allow for quick and easy installation of the light fixture 12. In one example, the clip devices 14(1)-14(4) are formed from sheet metal, although the clip devices 14(1)-14(4) can be formed of other suitable materials. The hinges are formed from areas of reduced thickness in the sheet metal to allow for the sheet metal to be bendable at the hinge locations, although other suitable bendable materials may be employed for the clip devices 14(1)-14(4).

The exemplary clip device 14(1) will now be described with specific reference to FIGS. 3A-3C and 4A-4C. It is to be understood that the clip devices 14(2)-14(4) are similar in structure and function. The clip device 14(1) includes a base 22 configured to be located the surface 18 of the light fixture 12. In this example, the base 22 has two sections connected to one another by an edge portion 24. The base 22 comprises a pair of apertures 26, such as holes or slots, each configured to receive a screw 28 to couple the base 22 to the surface 18 of the lighting fixture 12, although other methods can be employed, using other types of attachment mechanisms known in the art, such as a rivet by way of example only, to couple the clip device 14(1) to the light fixture 12.

Figure 3A:
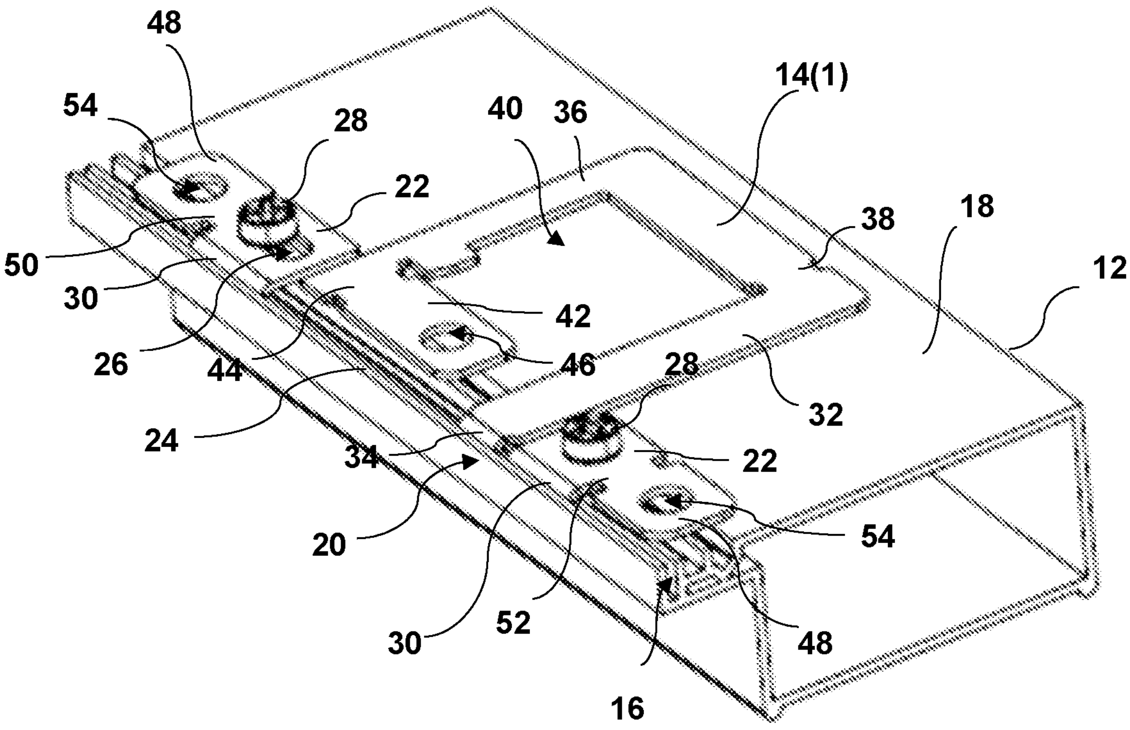
FIGS. 3A-3C are isometric cross-sectional views of a portion of the light fixture shown in FIG. 1 with one of the plurality of clip devices in various configurations, according to aspects of the present disclosure.
Figure 3B:
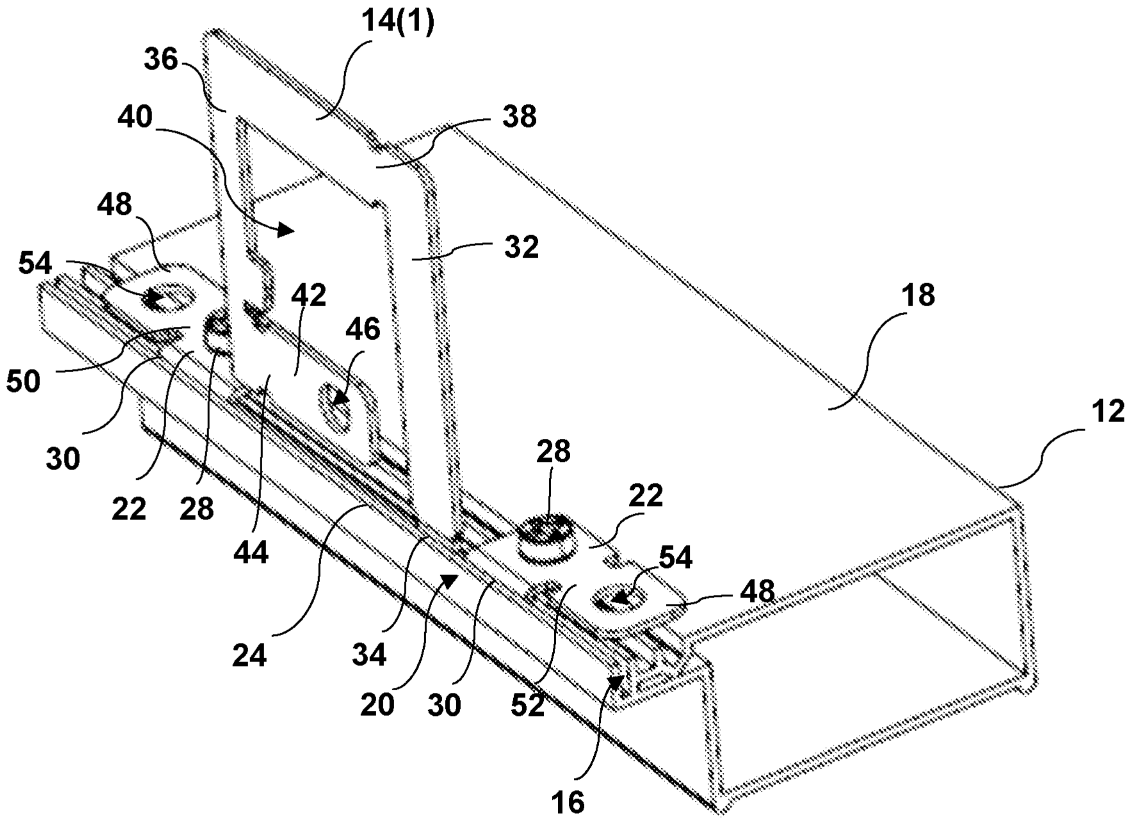
Figure 3C:
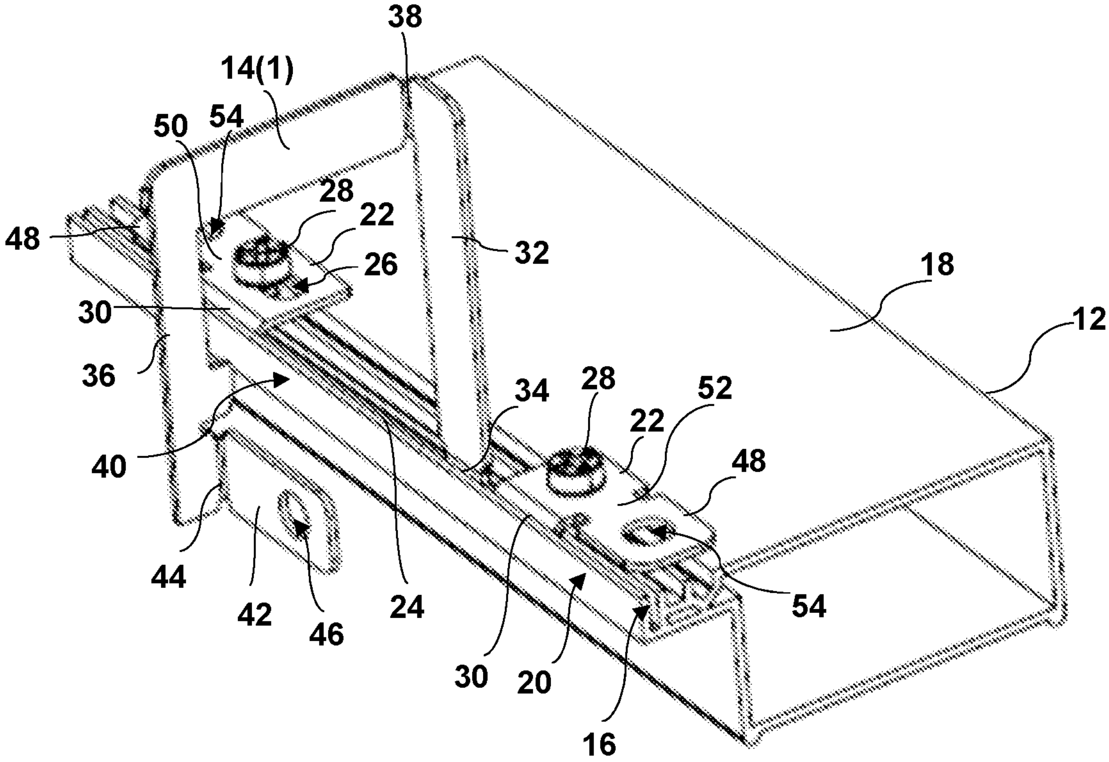

The edge portion 24 extends from an edge 30 of the base 22. In this example, the edge portion 24 extends substantially 90 degrees from the base 22, such that the base 22 can be positioned flat on the surface 18 of the light fixture 12. The edge portion 24 is configured to be located in the recess 16 in the surface 18 of the light fixture 12, as shown in FIGS. 3A-3C. This configuration allows for edge mounting the clip device 14(1) to the light fixture 12.

Figure 4A:
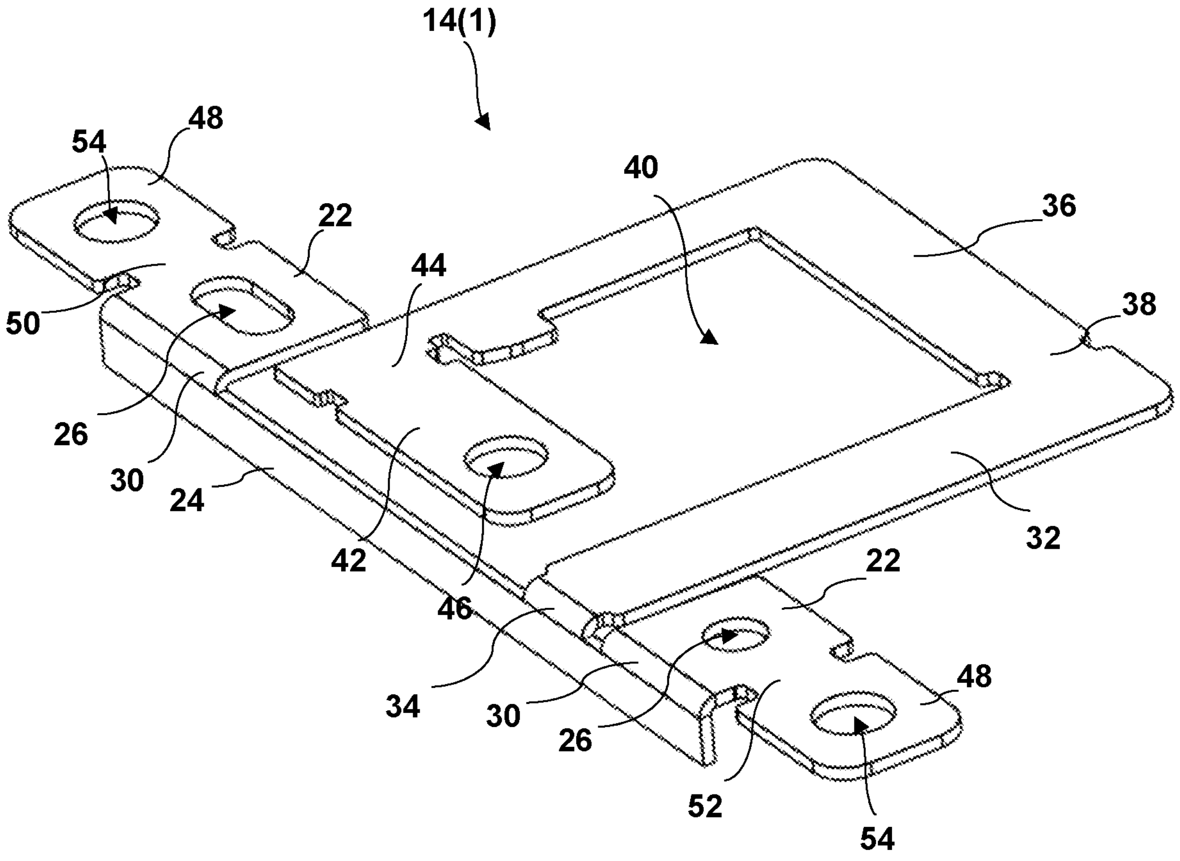
FIGS. 4A-4C are isometric views of an exemplary clip device in various configurations, according to aspects of the present disclosure.
Figure 4B:
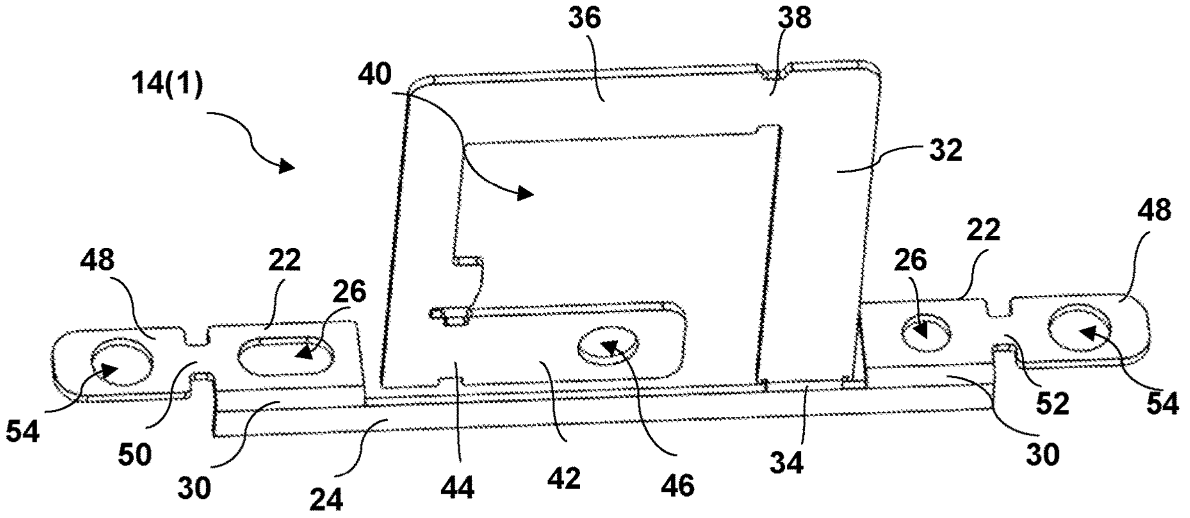

An arm 32 extends from the edge portion 24 through a first hinge 34 such that the arm 32 is bendable between a substantially horizontal orientation with respect to the surface 18 of the light fixture 12 (as shown in FIGS. 3A and 4A) to a substantially vertical orientation with respect to the surface 18 of the light fixture 12 for installation (as shown in FIGS. 3B and 4B). The first hinge 34 in this example is a reduced area of thickness that allows for the arm 34 to be bent with respect to the edge portion 24. The substantially horizontal orientation advantageously allows the light fixture 12 to be shipped with the clip devices installed (as shown in FIG. 1), without increasing the thickness of the light fixture system 10. Further, in the substantially horizontal orientation, the clip devices 14(1)-14(4) do not extend outside of the frame of the light fixture 12. This permits the clip devices 14(1)-14(4) to remain on the light fixture 12 in either a grid mounted or suspension mounted use.

Figure 5A:
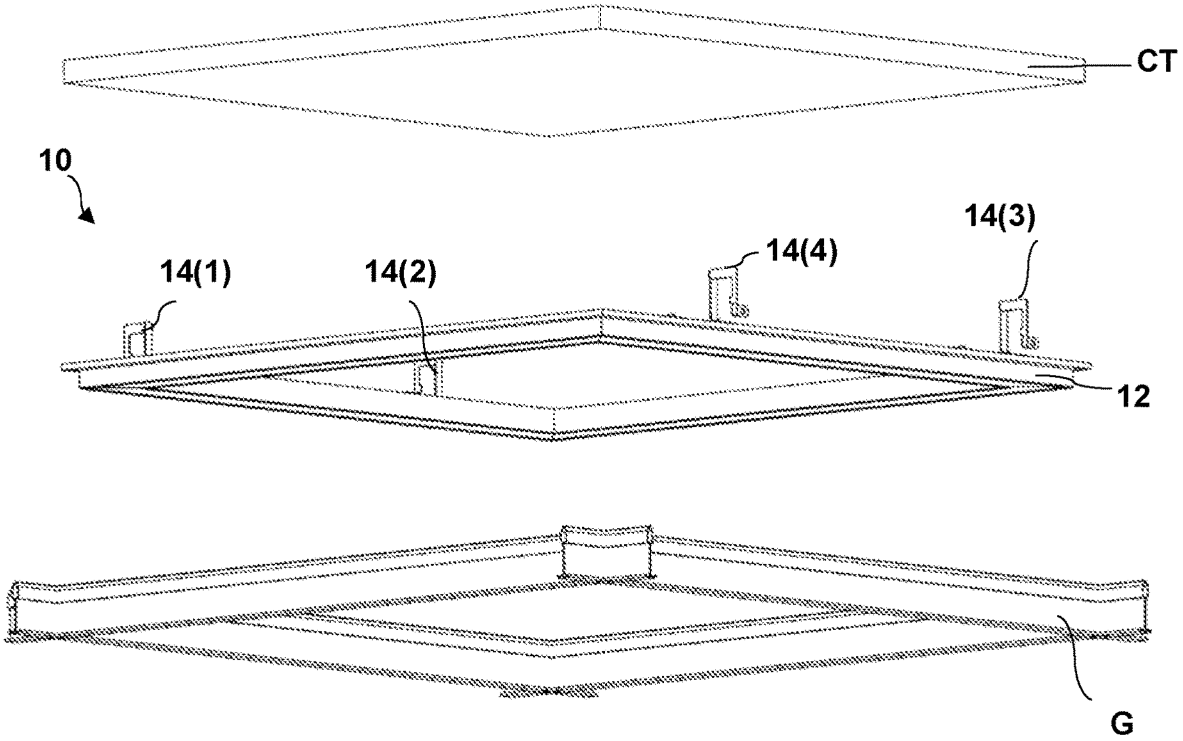
FIG. 5A is an isometric exploded view of a light fixture system, ceiling grid, and ceiling grid tile, according to aspects of the present disclosure.
Figure 5B:
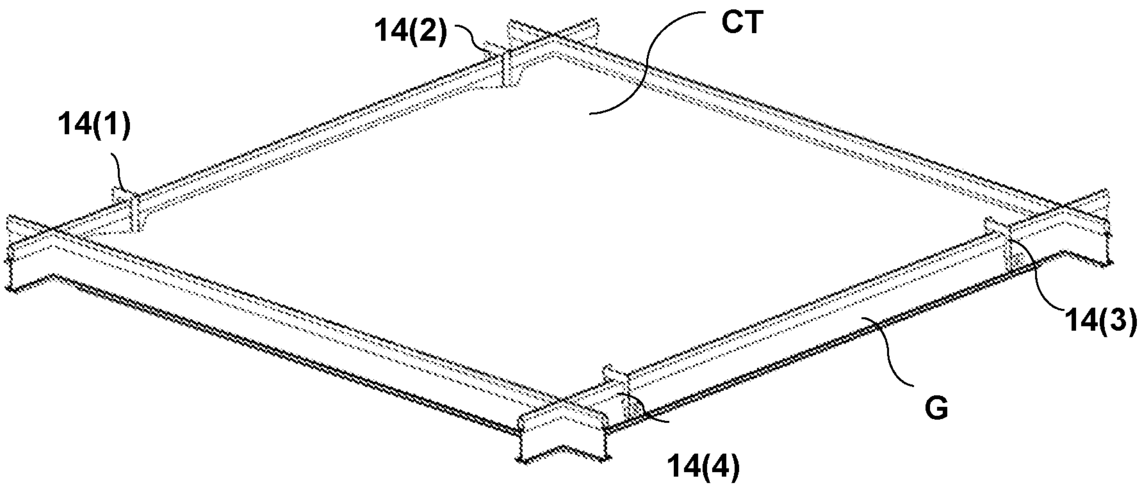
FIG. 5B is an isometric top view of the light fixture system mounted to a ceiling grid tile, according to aspects of the present disclosure.
Figure 5C:
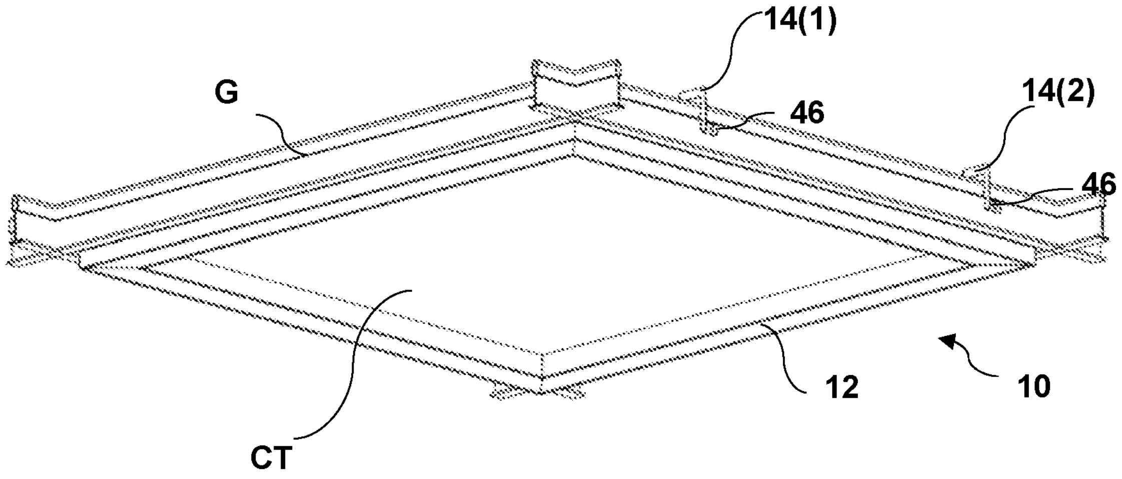
FIG. 5C is an isometric bottom view of the light fixture system mounted to a ceiling grid tile, according to aspects of the present disclosure.

Referring now to FIGS. 5A-5C, the vertical orientation of the arm 32 allows the clip devices 14(1)-14(4) to be located along the edges of the ceiling tile (CT) during installation on the ceiling tile grid (G), which allows for installation without having to cut the ceiling tile (CT). From the vertical orientation, the installer can manipulate the clip devices 14(1)-14(4) to provide for mounting on the ceiling tile grid (G), as described in further detail below.

Figure 4C:
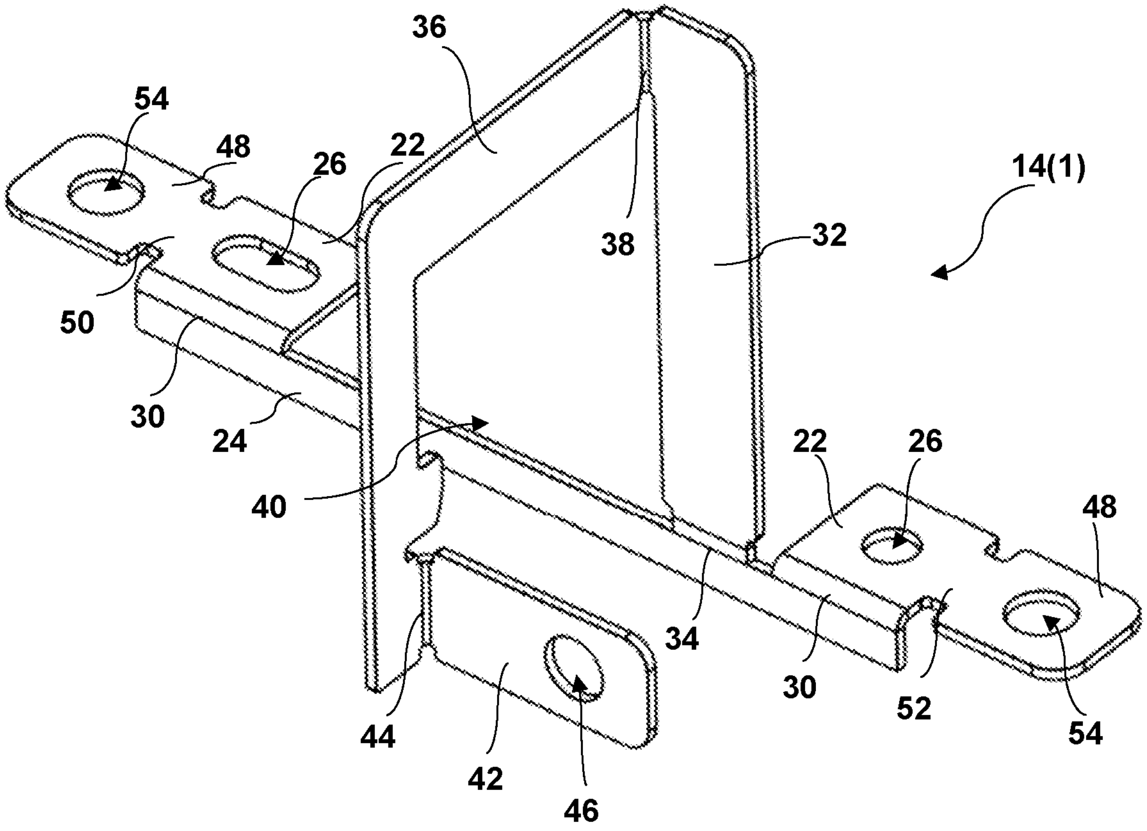

Referring again to FIGS. 3A-3C and 4A-4C, the clip device 14(1) further includes a channel element 36 that extends from the arm 32 through a second hinge 38. The second hinge 38 in this example is a reduced area of thickness that allows for the channel element 36 to be bent with respect to the arm 32. Accordingly, the channel element 36 is bendable to form a channel 40. In this example, the channel element 36 is L-shaped for receiving the portion of the ceiling tile grid (G). Referring to FIGS. 3C and 4C, in order to install the clip device 14(1), the installer would bend the channel element 36 along the hinge 38 in a direction outward from the edge portion 24 of the clip device 14(1), such that the channel 40 is positioned for receiving a portion of the ceiling tile grid (G) (as shown in FIGS. 5B and 5C) to mount the light fixture 12 to the ceiling tile grid (G). In this example, the channel element 36 is L-shaped for receiving the portion of the ceiling tile grid (G), although other configurations could be employed.

Referring again to FIGS. 3A-3C and 4A-4C, the clip device 14(1) also includes an attachment element 42 extending from the channel element 36 through a third hinge 44. The third hinge 44 in this example is a reduced area of thickness that allows for the attachment element 42 to be bent with respect to the channel element 36 (as shown in FIGS. 3C and 4C). The attachment element 42 is configured to be positioned along an outer surface of the portion of the ceiling tile grid (G) when installed, as shown for example in FIG. 5C. The attachment element 42 includes an aperture, such as a slot or hole, for receiving a screw or other attachment mechanism, such as a rivet for example, to secure the attachment element 42 to the outer surface of the ceiling grid (G) when the light fixture 12 is mounted therein.

Figure 6:
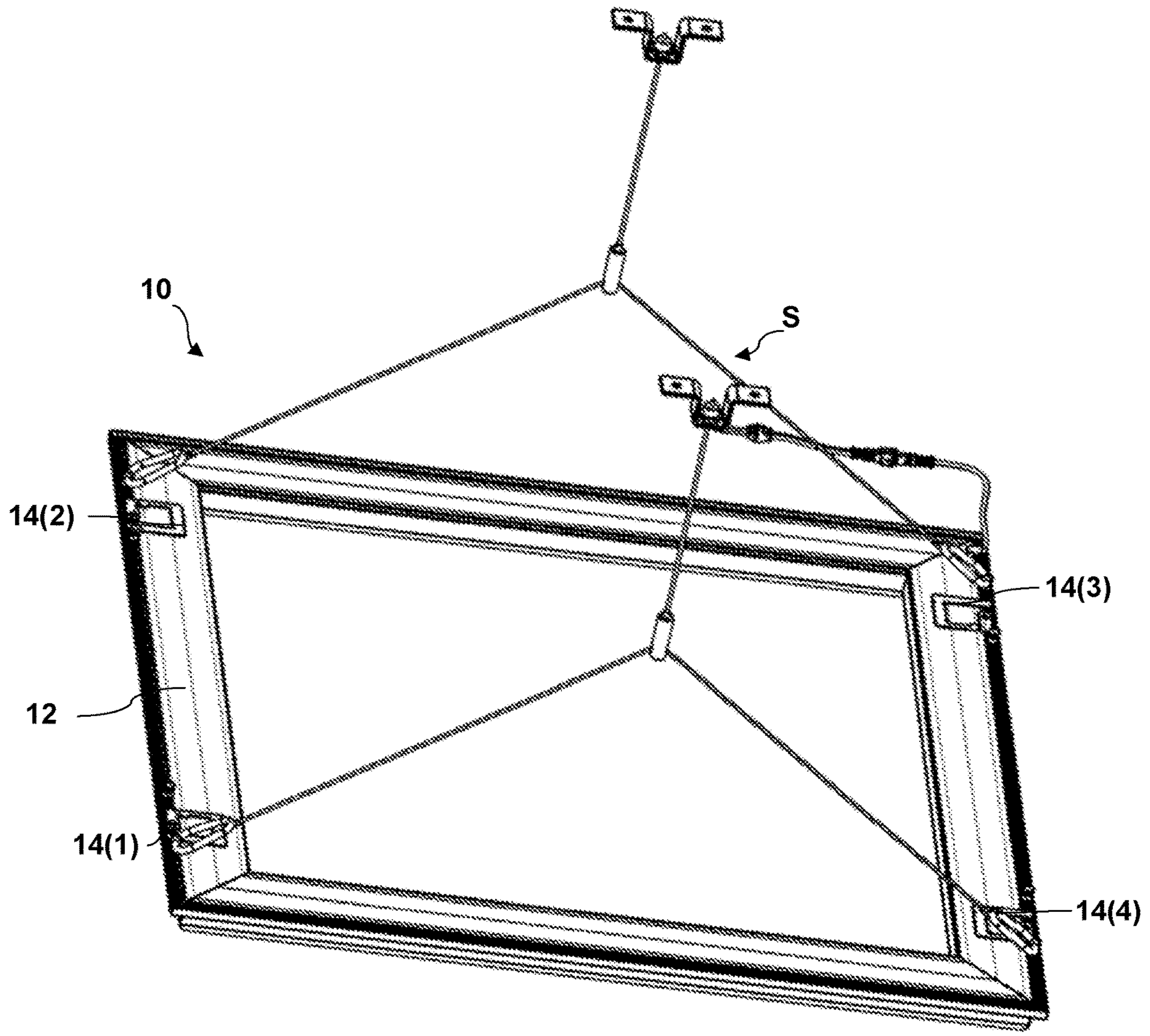
FIG. 6 is an isometric view of the light fixture system suspension mounted, according to aspects of the present disclosure.
Figure 7:
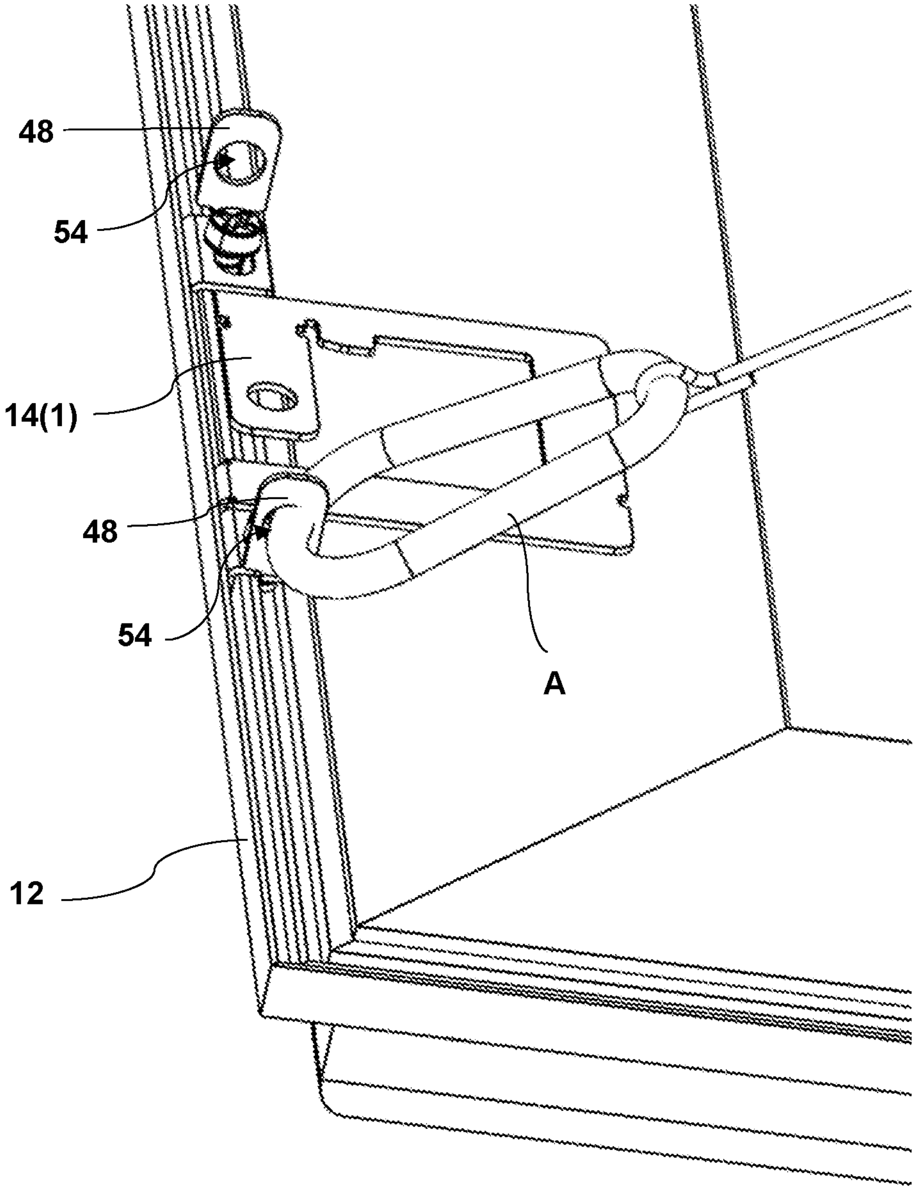
FIG. 7 is a close-up isometric view of a portion of the light fixture shown in FIG. 7 with one of the plurality of clip devices suspension mounted, according to aspects of the present disclosure.

In another example, the light fixture system 10 can be suspension mounted as shown in FIGS. 6 and 7 using a suspension mounting device S. In this configuration, the clip devices 14(1) and 14(4) are advantageously configured so they are not visible from below when the light fixture 12 is mounted in this fashion. Referring again more specifically to FIGS. 3A-3C and 4A-4C, the clip device 14(1) includes a pair of flanges 48 extending from opposing ends of the base 22 through a fourth hinge 50 and a fifth hinge 52, respectively. The fourth hinge 50 and the fifth hinge 52 in this example are reduced areas of thickness that allow for the flanges 48 to be bent with respect to the base 22. The pair of flanges 48 are each bendable between a substantially horizontal orientation with respect to the surface 18 of the light fixture 12 (as shown in FIGS. 3A-3C and 4A-4C) to a substantially vertical orientation with respect to the surface 18 of the light fixture 12 (as shown in FIG. 7). The pair of flanges 48 have apertures 54, such as slots or holes, that are configured to receive an attachment mechanism (A), such as a carabiner, of the suspension mounting device(S), for suspension mounting of the light fixture 12, as shown in FIGS. 6 and 7. In other examples, the apertures 54 could be used in the configuration shown in FIGS. 3A-3C and 4A-4C to attach the clip devices 14(1)-14(4) to the surface 18 of the light fixture 12.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The above-described examples of the described subject matter can be implemented in any of numerous ways. For example, some aspects can be implemented using hardware, software, or a combination thereof. When any aspect is implemented at least in part in software, the software code can be executed on any suitable processor or collection of processors, whether provided in a single device or computer or distributed among multiple devices/computers.

The flowchart and block diagrams in the Figures illustrate the architecture, functionality, and operation of possible implementations of systems, methods, and computer program products according to various examples of the present disclosure. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Other implementations are within the scope of the following claims and other claims to which the applicant can be entitled.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize or be able to ascertain using no more than routine experimentation, many equivalents to the specific examples described herein. It is, therefore, to be understood that the foregoing examples are presented by way of example only and that, within the scope of the appended claims and equivalents thereto, examples can be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A clip device for mounting a light fixture to a ceiling tile grid, the clip device comprising:

a base configured to be located on a surface of the light fixture;

an edge portion extending from an edge of the base, the edge portion configured to be located in a recess in the surface of the light fixture located proximate to an outer perimeter of the light fixture;

an arm extending from the edge portion through a first hinge such that the arm is bendable between a substantially horizontal orientation with respect to the surface of the light fixture to a substantially vertical orientation with respect to the surface of the light fixture when installed; and a channel element extending from the arm through a second hinge such that the channel element is bendable to form a channel for receiving a portion of the ceiling tile grid to mount the light fixture to the ceiling tile grid.

2. The clip device of claim 1, wherein the clip device is formed from sheet metal.

3. The clip device of claim 2, wherein the first hinge and the second hinge are formed from areas of reduced thickness in the sheet metal.

4. The clip device of claim 1, wherein the base comprises a pair of apertures each configured to receive an attachment mechanism to couple the base to the surface of the lighting fixture.

5. The clip device of claim 1, wherein the channel element is L-shaped for receiving the portion of the ceiling tile grid.

6. The clip device of claim 1 further comprising:

an attachment element extending from the channel element through a third hinge, the attachment element configured to be positioned along a surface of the portion of the ceiling tile grid when installed.

7. The clip device of claim 6, wherein the attachment element comprises an aperture for receiving an attachment mechanism to secure the attachment element to the portion of the ceiling tile grid.

8. The clip device of claim 1 further comprising:

a pair of flanges extending from opposing ends of the base through a fourth hinge and a fifth hinge, respectively, such that the pair of flanges are each bendable between a substantially horizontal orientation with respect to the surface of the light fixture to a substantially vertical orientation with respect to the surface of the light fixture when installed, the pair of flanges being configured to receive a suspension mounting device for suspension mounting of the light fixture.

9. A light fixture system comprising:

a light fixture configured to be mounted to a ceiling tile grid, the light fixture having a recess in a surface thereof, the recess being located around an outer perimeter of the surface; and a set of clip devices, each of the clip devices comprising:

a base configured to be coupled to the surface of the light fixture;

an edge portion extending from an edge of the base, the edge portion configured to be located in the recess in the surface of the light fixture;

an arm extending from the edge portion through a first hinge such that the arm is bendable between a substantially horizontal orientation with respect to the surface of the light fixture to a substantially vertical orientation with respect to the surface of the light fixture when installed; and a channel element extending from the arm through a second hinge such that the channel element is bendable to form a channel for receiving a portion of the ceiling tile grid to mount the light fixture to the ceiling tile grid.

10. The light fixture system of claim 9, wherein the set of clip devices are positioned such that they are not visible from below when the light fixture system is suspension mounted.

11. The light fixture system of claim 9, wherein the base of each of the set of clip devices comprises a pair of apertures each configured to receive an attachment mechanism to couple the base to the surface of the lighting fixture.

12. The light fixture system of claim 9, wherein each of the set of clip devices are configured to be positioned flat against the surface of the light fixture prior to installation and within the outer perimeter of the light fixture.

13. The light fixture system of claim 9, wherein the channel element is L-shaped for receiving the portion of the ceiling tile grid.

14. The light fixture system of claim 9, wherein each of the set of clip devices further comprises an attachment element extending from the channel element through a third hinge, the attachment element configured to be positioned along a surface of the portion of the ceiling tile grid when installed, the attachment element comprising an aperture for receiving an attachment mechanism to secure the attachment element to the portion of the ceiling grid.

15. The light fixture system of claim 9, wherein each of the set of clip devices comprises a pair of flanges extending from opposing ends of the base through a fourth hinge and a fifth hinge, respectively, such that the pair of flanges are each bendable between a substantially horizontal orientation with respect to the surface of the light fixture to a substantially vertical orientation with respect to the surface of the light fixture when installed, the pair of flanges being configured to receive a suspension mounting device for suspension mounting of the light fixture.

* * * * *